(12) United States Patent  (10) Patent No.: US 7,532,761 B2
Tredoux  (45) Date of Patent: May 12, 2009

(54) SYSTEM AND METHOD FOR OPTIMIZING DATA RECOVERY FOR A PARTIALLY DESTROYED DOCUMENT

(75) Inventor: Gavan Leonard Tredoux, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 680 days.

(21) Appl. No.: 11/296,012

(22) Filed: Dec. 7, 2005

(65) Prior Publication Data

US 2007/0127770 A1   Jun. 7, 2007

(51) Int. Cl.
  *G06K 9/36* (2006.01)
(52) U.S. Cl. ........................... 382/232; 713/176
(58) Field of Classification Search ........... 382/100, 382/232, 236–242; 380/54, 210, 252, 287; 713/176; 381/73.1; 348/460, 463
  See application file for complete search history.

(56) References Cited

U.S. PATENT DOCUMENTS

| | | | |
|---|---|---|---|
| 5,138,711 A * | 8/1992 | Miyoshi et al. ................ 707/1 |
| 5,245,165 A | 9/1993 | Zhang |
| 5,521,372 A | 5/1996 | Hecht et al. |
| 5,717,197 A | 2/1998 | Petrie |
| 5,761,686 A * | 6/1998 | Bloomberg ................ 715/234 |
| 5,929,429 A | 7/1999 | Petrie |
| 6,000,621 A | 12/1999 | Hecht et al. |
| 6,226,658 B1 * | 5/2001 | Smith ........................... 715/207 |
| 6,233,684 B1 * | 5/2001 | Stefik et al. .................. 713/176 |
| 6,553,129 B1 * | 4/2003 | Rhoads ....................... 382/100 |
| 6,631,205 B1 * | 10/2003 | Melen et al. ................. 382/154 |
| 7,017,816 B2 * | 3/2006 | Yen et al. ............... 235/462.25 |
| 2003/0068066 A1 * | 4/2003 | Goldberg et al. ............ 382/100 |
| 2004/0004733 A1 * | 1/2004 | Barker et al. ................ 358/1.13 |

* cited by examiner

*Primary Examiner*—Anand Bhatnagar
(74) *Attorney, Agent, or Firm*—Carter, DeLuca, Farrell & Schmidt, LLP

(57) ABSTRACT

A system and method are provided for optimizing data recovery for a partially destroyed document by exploiting the localized nature of typical partial document destruction. The system and method physically lay out encoded document recovery information in a way such that the likelihood is increased of recovering the encoded document recovery information from typical cases of partial document destruction. The system and method are encoding-scheme neutral, and could employ encoding techniques such as DataGlyphs™ encoding as known in the art for encoding the document recovery information.

26 Claims, 2 Drawing Sheets

SYSTEM AND METHOD FOR OPTIMIZING DATA RECOVERY FOR A PARTIALLY DESTROYED DOCUMENT

BACKGROUND

The present disclosure relates to data recovery, more specifically, to a system and method for optimizing data recovery for a partially destroyed document.

Printed or paper documents can be destroyed physically, through fire, cutting, tearing and other physical insults. Pages or whole sections of a printed document may be destroyed by such physical insults. Often only part of the printed document is destroyed, since the physical insult is localized to several pages or sections of the document. Once pages or regions within pages are destroyed, the information that was contained by these pages or regions is difficult to recover accurately. Existing solutions rely on storage of redundant information within the printed document, typically but not necessarily in digital form, using encoding schemes, to allow a degree of data recovery, depending critically on the extent of the damage. In such encoding schemes, the ability to recover data is proportional to the amount of redundancy built-in to the printed document.

There are several existing schemes for encoding document recovery information within a printed document to enable future recovery of the document. For instance, one may use Xerox™ DataGlyphs™, or some other two-dimensional digital coding scheme; there are also well-known steganographic techniques for concealing some representation of the document within itself. A highly desirable feature of such encoding techniques is the ability to encode document recovery information without extending the length of the original document. Another desirable feature is the ability to blend the encoded document recovery information into the original document without disturbing the document noticeably. Hence, existing encoding schemes are typically more, or less, transparent to the user of the document.

Data recovery encoding schemes may also vary in the faithfulness of their ability to recover the document; some schemes may only recover a rough representation of the original to assist forensic inspection of the document, while other schemes may recover high fidelity reproductions of the originals. One way in which a latter scheme encodes document recovery information is by optically rasterizing the pages of the document to produce a digital image of each page and then encoding the rasterized images in compressed form within the document. The scheme might use lossy image compression to achieve high compression ratios; the degree of lossiness being dictated by the fidelity requirement imposed on the recovered page image.

SUMMARY

According to the present disclosure, a system and method are provided for optimizing data recovery for a partially destroyed document by exploiting the localized nature of typical partial document destruction. The system and method of the present disclosure physically lay out encoded document recovery information in a way such that the likelihood is increased of recovering the encoded document recovery information from typical cases of partial document destruction. The system and method of the present disclosure are encoding-scheme neutral, and could employ encoding techniques such as DataGlyphs™ encoding as known in the art for encoding the document recovery information.

In particular, according to one aspect of the present disclosure, a system for optimizing data recovery for a partially destroyed document is provided. The system includes a processor, an encoding module storing a series of programmable instructions capable of being executed by the processor for encoding document recovery information corresponding to an original document, and a data recovery optimization module storing a series of programmable instructions capable of being executed by the processor for determining a physical layout for printing the encoded document recovery information on a copy of the original document. Utilizing the system of the present disclosure the encoded document recovery information can be reproduced on the document copy and at least a portion thereof recovered in instances where the document copy is locally destroyed or degraded (i.e., contiguous page loss and/or contiguous region loss). The processor can be resident within a personal computer, PDA, computer terminal, xerographic apparatus, reprographic apparatus, or other apparatus or device.

According to another aspect of the present disclosure, a method is provided for encoding document recovery information corresponding to a document, and determining a physical layout for printing the encoded document recovery information on a copy of the original document. The step of determining a physical layout for the encoded document recovery information includes assigning the encoded document recovery information for page i of an n-page document on page (i+s) mod n, where s is a shift given by n/2 rounded to the nearest integer, where pages are numbered as 0, 1, 2, . . . onward for convenience. The step of determining a physical layout for the encoded document recovery information can include dividing at least one page of the document into symmetrical regions and assigning the encoded document recovery information corresponding to each symmetrical region to a directly opposite symmetrical region.

It is evident that each determining step addresses separate dimensions of document destruction. There is a greater likelihood of recovering the encoded document recovery information of a destroyed document if both determining steps are performed, such that each page of the document is assigned encoded document recovery information corresponding to another page of the document, and each region of the page is assigned encoded document recovery information corresponding to another region of the page.

The method of the present disclosure further includes the step of printing (or otherwise reproducing) the original document to obtain the document copy where the encoded document recovery information is positioned on the document copy in accordance with the determined physical layout.

BRIEF DESCRIPTION OF THE DRAWINGS

Various embodiments of the present disclosure will be described herein below with reference to the figures wherein.

DETAILED DESCRIPTION

Figure 1:
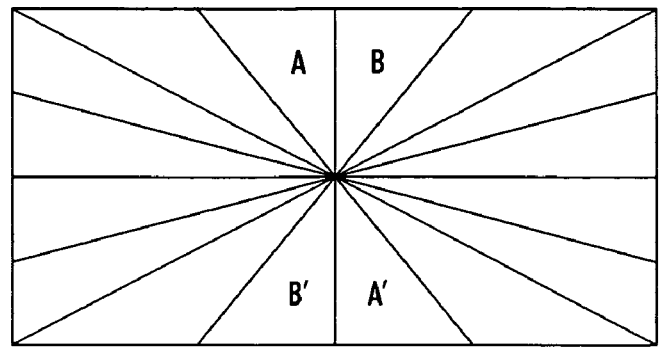
FIG. 1 is an illustration of a page divided into a plurality of symmetrical regions for optimizing data recovery according to the present disclosure.

Embodiments of the present disclosure will be described herein below with reference to the accompanying drawings. In the following description, well-known functions or constructions are not described in detail to avoid obscuring the present disclosure in unnecessary detail.

The system and method of the present disclosure optimize data recovery for a partially destroyed document. Even though the system and method of the present disclosure are described herein in the context of optimizing data recovery for a partially destroyed document, it is understood that the system and method of the present disclosure can be utilized for optimizing data recovery for computer-readable data embedded on surfaces other than paper, such as plastic, glass and metal, and for non-flat surfaces, such as curved surfaces.

The present disclosure provides an encoding-neutral system and method for physically laying out encoded document recovery information on a document having a single page or multiple pages so that a greater degree of data recovery is possible in common cases of partial document destruction, caused by burning, cutting, tearing and other physical insults.

The present disclosure utilizes the fact that partial destruction of a physical paper document is often contiguous or localized; whole regions of the document are destroyed at a time, and sets of pages of the document are lost. Although it is possible that random pages of a document may be lost, or that multiple disconnected regions of one or more pages may be destroyed, this is less common than localized partial destruction due to the physical nature of paper documents.

Partial document destruction can be contrasted to, say, digital loss during signal transmission, when random bits may be dropped at any stage of the transmission. One does not expect a document to develop a random pattern of pinpricks or holes throughout, since destruction of a physical document is more typically localized. This implies that a region can be identified within the document where the damage occurred, and some or a portion of this region may be destroyed (by burning, cutting, tearing or some other physical insult, such as moth-holes).

The system and method according to the present disclosure are compatible with many current and future schemes for encoding document information, aiming to optimize the capabilities of all such schemes in cases where physical destruction of a document is contiguous in nature. There are several existing schemes for encoding document recovery information within a printed document to enable future recovery of the document. For instance, one may use Xerox™ DataGlyphs™, or some other two-dimensional digital coding scheme; there are also well-known steganographic techniques for concealing some representation of the document within itself.

The present disclosure does not require that a particular encoding scheme is used. The only requirement is that the encoding scheme used is capable of storing its information, whether it is analog or digital, using no more pages than the original document.

The key idea of the system and method of the present disclosure is to determine the physical layout of the encoded document recovery information prior to printing or reproducing the document having the encoded document recovery information provided thereon. The physical layout provides a blueprint for printing the encoded document recovery information for a part of a document in place(s) unlikely to be damaged in the same event as the corresponding part of the document, e.g., print the encoded document recovery information in the center of a page or on a different page. The present disclosure provides several examples of physical layouts which enable data to be recovered from missing pages, side-to-side data losses on a particular page, and outer-fringe document destruction.

The system and method according to an embodiment of the present disclosure include encoding document recovery information corresponding to a document, and determining a physical layout for printing the encoded document recovery information on a copy of the original document. The system and method provide for the encoded document recovery information to be embedded on the document copy and at least a portion thereof recovered in instances where the document copy is locally destroyed or degraded (i.e., contiguous page loss and/or contiguous region loss).

The determining step in accordance with the present disclosure has two parts. The first part specifies the allocation of the encoded document recovery information to physical pages within the document; the second part specifies the location within each individual page of the encoded document recovery information.

As described in detail below, in the first part, the step of determining a physical layout for the encoded document recovery information includes assigning the encoded document recovery information for page i of an n-page document on page (i+s) mod n, where s is a shift given by n/2 rounded to the nearest integer. In the second part, the step of determining a physical layout for the encoded document recovery information can include dividing at least one page of the document into symmetrical regions and assigning the encoded document recovery information corresponding to each symmetrical region to a directly opposite symmetrical region.

It is evident that each determining step addresses separate dimensions of document destruction. Accordingly, there is a greater likelihood of recovering the document information of a destroyed document if both determining steps are performed, such that each page of the document is assigned encoded document recovery information corresponding to another page of the document, and each region of the page is assigned encoded document recovery information corresponding to another region of the page.

Part One

When document recovery information for a document is encoded, the page length of the document and all the contents of the document are known in advance. It is possible, therefore, to choose which pages to store or print the encoded document recovery information on. Since page loss from a document is often contiguous, so that pages close to each other are lost in chunks or blocks, encoded document recovery information can be arranged in an order within the document that minimizes the likelihood that a set of pages and their corresponding encoded document recovery information are all lost at the same time.

In Table 1 below, an assignment of encoded document recovery information to pages, for an eight-page document, is shown that permits recovery of fully half of the document if it is lost en-bloc (for convenience, the pages are numbered from zero onward).

TABLE 1

| Original page: | 0 | 1 | 2 | 3 | 4 | 5 | 6 | 7 |
|---|---|---|---|---|---|---|---|---|
| Recovery page: | 4 | 5 | 6 | 7 | 0 | 1 | 2 | 3 |

It can be seen from the recovery ordering (or physical layout of the encoded document recovery information) shown above by Table 1 that if a contiguous block of pages is lost, and the size of the block is at most half of the document, the block of pages can be completely recovered. This is because according to the present disclosure a contiguous block of four pages of the document will never contain the encoded document recovery information for any of those four pages. Loss of larger blocks (i.e., more than half of the document pages) would result in data loss.

According to the present disclosure, for page i of an n-page document, encoded document recovery information is assigned on page (i+s) mod n, where s is a shift given by n/2 rounded to the nearest integer, where pages are numbered as 0, 1, 2, . . . onward for convenience. For a document with an even number of pages, as in the example above, the loss of a contiguous block of n/2 pages, or half the page length, can be recovered. For a document with an odd number of pages, a contiguous loss of slightly less than half the page length can always be recovered, since n/2 must be rounded. (Note that it makes no difference in this respect if n/2 is rounded up or down.) The odd case is shown in Table 2 below, with the additional row showing what happens if n/2 is rounded up instead of down.

TABLE 2

| Original page: | 0 | 1 | 2 | 3 | 4 | 5 | 6 | 7 | 8 |
|---|---|---|---|---|---|---|---|---|---|
| Recovery page: | 4 | 5 | 6 | 7 | 8 | 0 | 1 | 2 | 3 |
| (or, rounded up) | 5 | 6 | 7 | 8 | 0 | 1 | 2 | 3 | 4 |

If pages are lost from the document randomly, any derangement (i.e., a permutation where no element is left in the same place) of the page order where encoded document recovery information is kept will do as well as any other derangement, but the odds of recovery will be no better than the laws of chance allow. Greater recovery rates are guaranteed in the method of the present disclosure given by the additional assumption that the page loss is contiguous; an assumption that is reasonable because of the physical nature of documents and the ways in which documents are typically handled.

The system and method may be extended if greater compression ratios are possible using the information coding scheme chosen, by storing redundant encoded document recovery information, so that a page may be recovered from more than one location. Thus, if the document coding scheme allows a 50% compression of the image, in terms of the physical page space required to hold it, several order derangements or physical layouts of the encoded document recovery information can be used at once. This is illustrated in Table 3 below:

TABLE 3

| Original page: | 0 | 1 | 2 | 3 | 4 | 5 | 6 | 7 | 8 |
|---|---|---|---|---|---|---|---|---|---|
| Recovery page: | 4 | 5 | 6 | 7 | 8 | 0 | 1 | 2 | 3 |
| Also on page | 6 | 7 | 8 | 0 | 1 | 2 | 3 | 4 | 5 |

So, if any two pages are lost, the encoded document recovery information will exist on a third page. This idea may be extended to cover n levels of redundancy, bounded in practice by the capabilities of the coding scheme chosen for increasing the likelihood of recovering the entire document from partial physical destruction.

Part Two

The second part addresses cases where whole regions of a document are destroyed, in a way that affects all pages. For example, a document may be cut or torn in half, partially burnt, or drilled for binding along an edge. The discussion below considers the worst-case scenario in which all pages are affected (less severe cases follow naturally from the worst cases, since more information than is strictly required in those cases can be recovered). Since all pages are affected, one may think of the document simply in terms of the physical layout in two dimensions.

For the second part, the key assumption made is that the damage will be regional, i.e. physically contiguous, in nature. The method attempts to ensure that encoded document recovery information for a region is not stored in the same region. Thus, if a region is destroyed, the encoded document recovery information for any set of pages still exists because it is stored in a region that has not been destroyed. Note that this would be impossible to guarantee if a document developed random destruction throughout.

The system and method divide a page systematically into symmetrical regions. The number of regions used would be bounded in practice by the information recovery mechanism used. If more regions are used, more information can be recovered. FIG. 1 shows division of a page into multiple symmetrical regions.

FIG. 1 shows that region B has encoded document recovery information stored symmetrically opposite in region B'. Likewise, encoded document recovery information for region B' is stored in region B. Similarly, for regions A and A', and all other unnamed regions of the page layout. It is clear that if the page is cut along any of the lines shown, encoded document recovery information will always be symmetrically opposite and if one side is discarded, the other will have the required encoded document recovery information.

Figure 2:
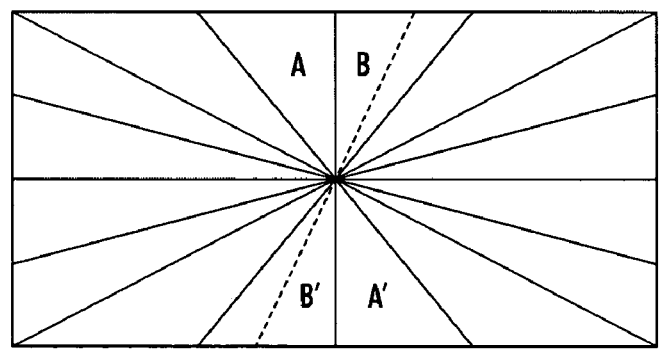
FIG. 2 is an illustration of the pages shown in FIG. 1 with a cut line indicating partial destruction of the page.

Since each line divides the document into two, fully half of the document may be destroyed in this way and then recovered form the other half. If the document is divided at a different angle, then some small loss will occur, as shown in FIG. 2, when the dotted line indicates a cut. The loss, or error, can be minimized by introducing more regions, which is a limiting procedure: as the number of regions increases, the error tends to zero.

Since the system and method cope with the loss of fully half of the document, with an error determined by the number of regions, the method and system also cope with smaller losses in which less than half of the document is cut off, torn off, burnt, or otherwise destroyed or mutilated, provided that this loss is confined to a physical location of the page that can be delimited by the regions used.

Figure 3:
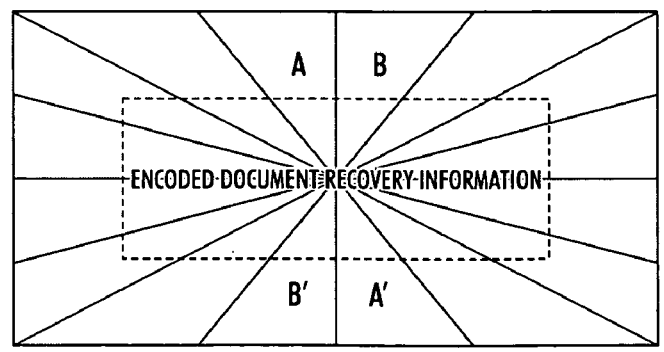
FIG. 3 is an illustration of a page having encoded document recovery information compressed and printed at a center thereof for optimizing data recovery, in accordance with the present disclosure, if the edges of the page are damaged.

The system and method may be extended to cope with damage in which the center of the document is punched out, by compressing encoded document recovery information to the edges, leaving the center unused. However, this sort of damage is not often encountered. More usefully, the method and system may be extended to cope instead with damage to the edges, by compressing encoded document recovery information to the center, away from the edges. The latter case would provide better recovery from partial fire damage, since document edges are most vulnerable to fire damage. FIG. 3 shows the encoded document recovery information confined to the central region indicated by the rectangle, so that burning at the edges will not affect the recovery of the encoded document recovery information.

The extent to which the arrangement shown by FIG. 3 is possible will be determined and bounded by the information coding scheme chosen, and the fidelity requirements of the recovered page image, since the arrangement shown by FIG. 3 requires additional compression of the encoded document recovery information.

By combining both parts described above to cope with both contiguous page loss and contiguous region loss over all pages, the ability to recover part or all of a document from partial physical destruction is enhanced.

After determining the physical layout of the encoded document recovery information, a copy of the original document can be reproduced by xerographic printing or otherwise to obtain a copy of the original document having the encoded document recovery information thereon according to the determined physical layout.

The system in accordance with the present disclosure performs the methodologies of the present disclosure as described above. The system includes a processor and two modules each storing a set of programmable instructions capable of being executed by the processor for performing various functions, including encoding document recovery information corresponding to an original document and determining a physical layout for xerographically printing (or otherwise reproducing) the encoded document recovery information on a copy of the original document. The processor can be resident within a personal computer, PDA, computer terminal, xerographic apparatus (see FIG. 4), reprographic apparatus, or other document production apparatus or device.

Figure 4:
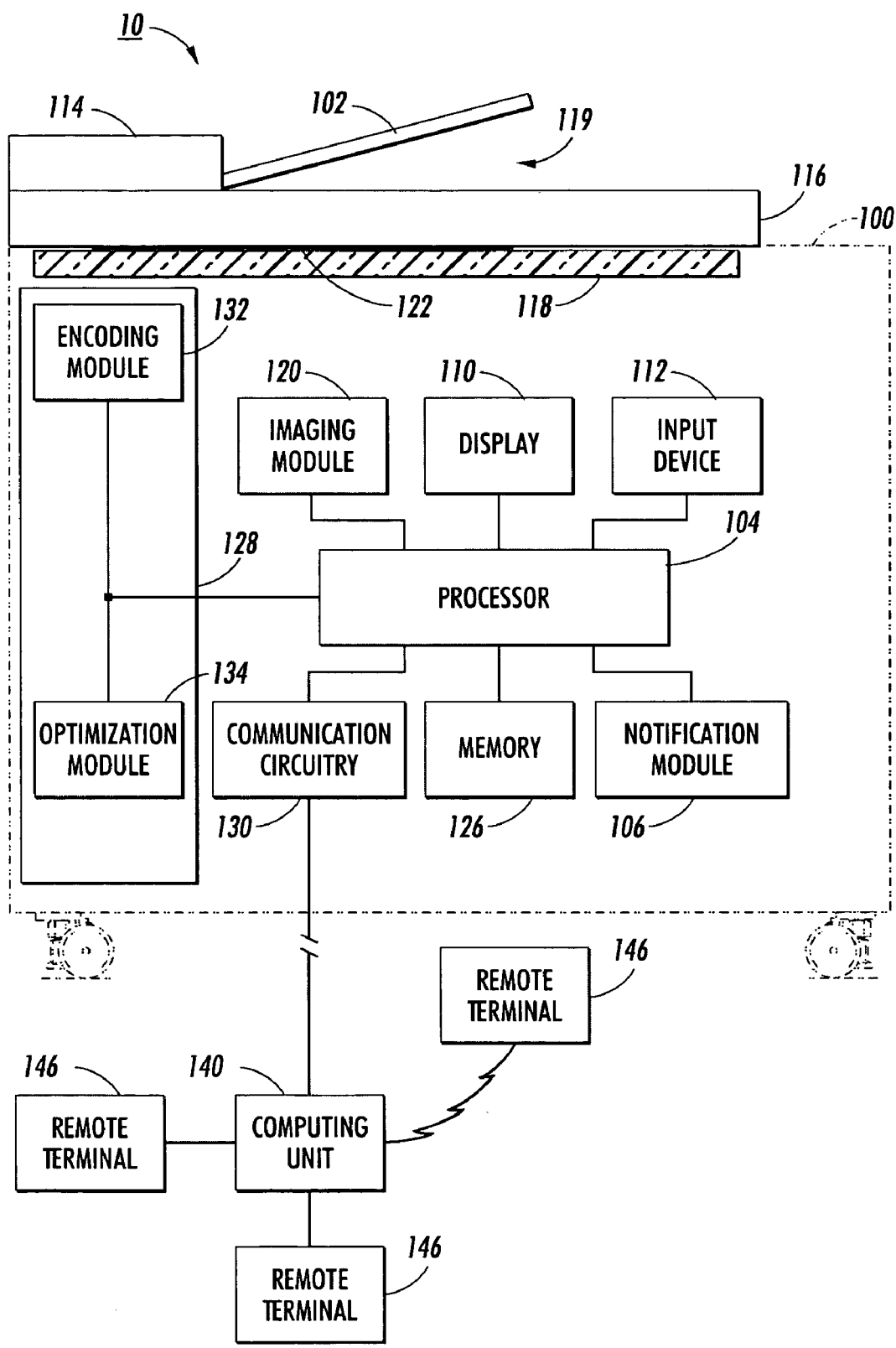
FIG. 4 is a schematic block diagram of a xerographic apparatus having a system for optimizing data recovery according to the present disclosure integrated therein.

With reference to FIG. 4, a system for optimizing data recovery for a partially destroyed document is shown in accordance with the present disclosure and is designated generally by reference numeral 10. The system 10 is integrated with a xerographic apparatus 100 having a variety of document production functionalities, such as for example, photocopying, scanning, printing and faxing functionalities. A processor 104 is included for running an operating system and/or other software for performing the document production functionalities and other functions in accordance with the present disclosure, such as determining a physical layout for encoded document recovery information.

The processor 104 is connected to memory 126 that is used for storing software and images of processed documents (e.g., images acquired during scanning, printing, copying, etc.), as well as storing physical layouts of encoded document recovery information as determined by the methodology of the present disclosure. The memory 126 also stores other data, such as user data, which may be utilized to limit access to the xerographic apparatus 100. In this sense, the xerographic apparatus 100 may require a user to input a user identification (user ID or log-in ID) along with a corresponding password (log-in password) to authenticate the user prior to enabling the user to use the document production functionalities as known in the art.

The xerographic apparatus 100 includes a display 110 for displaying a user interface which is configured to control the document production processes and an input device 112 (e.g., a keypad, a touch screen incorporated with the display 110) for transmitting commands to the processor 104 via the user interface.

The processor 104 also controls other components of the xerographic apparatus 100, such as an imager 118 which is located underneath a platen glass. The xerographic apparatus 100 also includes a cover 116 having a feeder 114 which automatically feeds one or more documents 122 held by a feeder tray 102 over the platen glass. The feeder 114 includes feeding means (e.g., guide rollers) which move the documents from the feeder tray 102 and places the documents over the platen glass and over the imager 118 whereupon the documents are scanned and extracted to a return tray 119. The imager 118 is controlled by an imaging module 120 which acquires and processes images of the documents.

The system 10 includes an encoding/data recovery optimization unit 128 having an encoding module 132, in the form of a FLASH ROM or other type of memory, storing a series of programmable instructions capable of being executed by the processor 104 for encoding document recovery information corresponding to an original document scanned by the imaging module 120. The encoding scheme used by the encoding module 132 for encoding the document recovery information can be, for example, DataGlyphs™ developed by Palo Alto Research Center Incorporated (PARC™), or any other encoding scheme. At 600 dpi, DataGlyphs™ can offer up to 1 KB per square inch of data.

The encoding/data recovery optimization unit 128 further includes a data recovery optimization module 134, in the form of a FLASH ROM or other type of memory, storing a series of programmable instructions capable of being executed by the processor 104 for receiving the encoded document recovery information from the encoding module 132 and determining a physical layout for printing the encoded document recovery information on a copy of the original document. A copy of the original document having the encoded document recovery information printed thereon can be printed by the xerographic apparatus 100 as known in the art.

Utilizing the xerographic apparatus 100 having the system 10 of the present disclosure integrated therein, the encoded document recovery information can be embedded on the document copy and at least a portion thereof recovered in instances where the document copy is locally destroyed or degraded (i.e., contiguous page loss and/or contiguous region loss).

It is envisioned for the encoding module 132 and the data recovery optimization module 134 of the system 10 to be stored externally from the xerographic apparatus 100, such as within one or more remote terminals 146 in operative communication with the processor 104. The modules 132, 134 can also be stored in computer readable media, such as a CD-ROM, memory card, hard drive, and 3.5" diskette. It is further envisioned for the series of programmable instructions corresponding to the two modules 132, 134 of the system 10 to be executed by a processor located externally from the xerographic apparatus 100, such as within one or more remote terminals 146 in operative communication with the processor 104.

The xerographic apparatus 100 further includes communication circuitry 130 having components for performing wireless and non-wireless communications for transmitting and receiving data, such as transmitting encoded document recovery information and corresponding physical layouts to remote terminals 146, which may include one or more reproduction and/or xerographic apparatuses, as well as receiving software updates from other computing units, including the remote terminals 146. The remote terminals 146 can also include cellular phones, pagers, personal digital assistants, set top boxes, personal computers, servers, or other electronic processing devices and apparatuses.

The communication circuitry 130 is configured to communicate with the computing unit 140 using specific communication standards and/or protocols, such as TCP/IP, IEEE 802.11, or Bluetooth™, over a network or non-network connection. The communication circuitry 130 can also transmit to the computing unit 140 copier usage data and other data, such as fault information relating to copier downtime and fault conditions, and number of pages copied, scanned, faxed, etc.

It is to be understood that the present disclosure may be implemented in various forms of hardware, software, firmware, special purpose processors, or a combination thereof. The computing unit 140 and remote terminals 146 may include one or more central processing units, memories, such random access memory, read only memory, etc., input/output devices, such as a keyboard, cursor control device, display, etc., and data storage devices, such as a hard drive, a CD-ROM drive, a DVD drive, etc.

The various processes and functions described herein, including the modules 132, 134, may either be part of micro instruction code, firmware, and/or part of the application program (or a combination thereof) which are executed via the processor 104, a processor of the computing unit 140, and/or a processor of the remote terminals 146. The functions in accordance with the present disclosure can also be performed by one or more ASICs provided within the xerographic apparatus 100, the computing unit 140 and/or the remote terminals 146.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for optimizing data recovery due to partial destruction of a document copy, said system comprising a processor programmed for performing a method comprising:
encoding an original document having document information and a length of n pages to encode said document information and provide encoded document recovery information;
determining a physical layout for the encoded document recovery information; and
transmitting said document recovery information and said physical layout to at least one reproduction device for reproducing the original document to provide said document copy having said document information and a length of n pages, said document copy further having the encoded document recovery information provided thereon in accordance with the physical layout, wherein the physical layout provides for assigning the encoded document recovery information corresponding to a page of said n-page document copy to another page of said n-page document copy.

2. The system according to claim 1, wherein said physical layout further provides for recovering at least a portion of the encoded document recovery information corresponding to said page for reproducing at least a portion of said page in instances where said page of said n-page document copy is at least partially destroyed.

3. The system according to claim 1, wherein the determining said physical layout comprises dividing each page of said document copy into a plurality of regions, and said reproducing comprises providing a respective portion of the encoded document recovery information corresponding to a particular region of a page in another region of said page, wherein said physical layout further provides for recovering said at least a portion of the encoded document recovery information for reproducing at least a portion of corresponding document information in instances where said document copy is partially destroyed due to contiguous region loss.

4. The system according to claim 1, wherein said reproducing the original document comprises compressing the encoded document recovery information and providing the compressed encoded document recovery information in a central region of each page of said n-page document copy.

5. The system according to claim 1, wherein for page i of said n-page original document, said determining a physical layout comprises assigning said encoded document recovery information on page (i+s) mod n, where s is a shift given by n/2 rounded to the nearest integer, where pages are numbered as 0, 1, 2, . . . .

6. The system according to claim 1, wherein said determining a physical layout comprises assigning to each page of said document copy encoded document recovery information corresponding to at least two other pages of said n-page original document.

7. The system according to claim 1, wherein said system is integrated with a xerographic apparatus.

8. A system for optimizing data recovery due to partial destruction of a document copy, said system comprising a processor programmed for performing a method comprising:
encoding an original document having document information and a length of n pages to encode said document information and provide encoded document recovery information;
determining a physical layout for the encoded document recovery information; and
transmitting said document recovery information and said physical layout to at least one reproduction device for reproducing the original document to provide said document copy having said document information and a length of n pages, said document copy further having the encoded document recovery information provided thereon in accordance with the physical layout, said physical layout further provides for recovering at least a portion of the encoded document recovery information for reproducing at least a portion of corresponding document information in instances where said n-page document copy is partially destroyed due to contiguous region loss.

9. The system according to claim 8, wherein said physical layout further provides for assigning the encoded document recovery information corresponding to a page of said n-page document copy to another page of said n-page document copy.

10. The system according to claim 8, wherein the determining said physical layout comprises dividing each page of said document copy into a plurality of regions, and said reproducing comprises providing a respective portion of the encoded document recovery information corresponding to a particular region of a page in another region of said page.

11. The system according to claim 8, wherein said reproducing the original document comprises means for compressing the encoded document recovery information and providing the compressed encoded document recovery information in a central region of each page of said n-page document copy.

12. The system according to claim 8, wherein for page i of said n-page original document, said determining a physical layout comprises assigning said encoded document recovery information on page (i+s) mod n, where s is a shift given by n/2 rounded to the nearest integer, where pages are numbered as 0, 1, 2, . . . .

13. The system according to claim 8, wherein said determining a physical layout comprises assigning to each page of said document copy encoded document recovery information corresponding to at least two other pages of said n-page original document.

14. A computer readable medium storing programmable instructions for being executed by a processor for performing a method for optimizing data recovery due to partial destruction of a document copy, said method comprising:
encoding an original document having document information and a length of n pages to encode said document information and provide encoded document recovery information;
determining a physical layout for the encoded document recovery information; and
transmitting said document recovery information and said physical layout to at least one reproduction device for reproducing the original document to provide said document copy having said document information and a length of n pages, said document copy further having the encoded document recovery information provided thereon in accordance with the physical layout, wherein the physical layout provides for assigning the encoded document recovery information corresponding to a page of said n-page document copy to another page of said n-page document copy.

15. A computer readable medium according to claim 14, wherein said physical layout further provides for recovering at least a portion of the encoded document recovery information corresponding to said page for reproducing at least a portion of said page in instances where said page of said n-page document copy is at least partially destroyed.

16. The computer readable medium according to claim 14, wherein determining a physical layout comprises dividing each page of said document copy into a plurality of regions, and said reproducing comprises providing a respective portion of the encoded document recovery information corresponding to a particular region of a page in another region of said page, wherein said physical layout further provides for recovering said at least a portion of the encoded document recovery information for reproducing at least a portion of corresponding document information in instances where said document copy is partially destroyed due to contiguous region loss.

17. The computer readable medium according to claim 14, wherein said reproducing comprises compressing the encoded document recovery information and providing the compressed encoded document recovery information in a central region of each page of said n-page document copy.

18. The computer readable medium according to claim 14, wherein for page i of said n-page original document, said determining a physical layout assigns said encoded document recovery information on page (i+s) mod n, where s is a shift given by n/2 rounded to the nearest integer, where pages are numbered as 0, 1, 2, . . . .

19. The computer readable medium according to claim 14, wherein determining a physical layout comprises assigning to each page of said document copy encoded document recovery information corresponding to at least two other pages of said n-page original document.

20. A computer readable medium storing programmable instructions for being executed by a processor for performing a method for optimizing data recovery due to partial destruction of a document copy, said method comprising:

encoding an original document having document information and a length of n pages to encode said document information and provide encoded document recovery information;

determining a physical layout for the encoded document recovery information; and transmitting said document recover information and said physical layout to at least one reproduction device for reproducing the original document to provide said document copy having said document information and a length of n pages, said document copy further having the encoded document recovery information provided thereon in accordance with the physical layout, said physical layout further provides for recovering at least a portion of the encoded document recovery information for reproducing at least a portion of corresponding document information in instances where said n-page document copy is partially destroyed due to contiguous region loss.

21. The computer readable medium according to claim 20, wherein said physical layout further provides for recovering said at least a portion of the encoded document recovery information corresponding to a page of said n-page document copy for reproducing at least a portion of said page in instances where said page of said n-page document copy is at least partially destroyed.

22. The computer readable medium according to claim 20, wherein said physical layout further provides for assigning the encoded document recovery information corresponding to a page of said n-page document copy to another page of said n-page document copy.

23. The computer readable medium according to claim 20, wherein determining a physical layout comprises dividing each page of said document copy into a plurality of regions, and said reproducing comprises providing a respective portion of the encoded document recovery information corresponding to a particular region of a page in another region of said page.

24. The computer readable medium according to claim 20, wherein said reproducing comprises compressing the encoded document recovery information and providing the compressed encoded document recovery information in a central region of each page of said n-page document copy.

25. The computer readable medium according to claim 20, wherein for page i of said n-page original document, said determining a physical layout assigns said encoded document recovery information on page (i+s) mod n, where s is a shift given by n/2 rounded to the nearest integer, where pages are numbered as 0, 1, 2, . . . .

26. The computer readable medium according to claim 20, wherein said determining a physical layout comprises assigning to each page of said document copy encoded document recovery information corresponding to at least two other pages of said n-page original document.

* * * * *